United States Patent
Lo et al.

(10) Patent No.: US 6,596,335 B1
(45) Date of Patent: Jul. 22, 2003

(54) REFRIGERATED READY TO EAT ASEPTICALLY PRODUCED RICE PUDDING

(75) Inventors: Chih-Yang G. Lo, Saddle Brook, NJ (US); Dominic J. Vellucci, Jr., Eastchester, NY (US); Donald L. Messick, Rehoboth Beach, DE (US); Harold L. Peet, Stony Point, NY (US); Mary M. Sole, Point Pleasant, NJ (US); Andrew E. McPherson, Mt. Prospect, IL (US); Jane L. MacDonald, Yorktown Heights, NY (US); Richard R. Leshik, Brookfield, CT (US)

(73) Assignee: Kraft Foods Holdings, Inc., Northfield, IL (US)

( * ) Notice: Subject to any disclaimer, the term of this patent is extended or adjusted under 35 U.S.C. 154(b) by 407 days.

(21) Appl. No.: 09/717,447

(22) Filed: Nov. 21, 2000

(51) Int. Cl.⁷ .............................. A23L 1/187
(52) U.S. Cl. ............. 426/579; 426/399; 426/509; 426/521; 426/522; 426/524
(58) Field of Search ................ 426/399, 579, 426/509, 521, 522, 524

(56) References Cited

U.S. PATENT DOCUMENTS

| | | | | |
|---|---|---|---|---|
| 4,166,868 A | | 9/1979 | Ando et al. ................. 426/441 |
| 4,192,900 A | * | 3/1980 | Cheng ........................ 426/579 |
| 4,308,295 A | | 12/1981 | Kuntz et al. ................ 426/618 |
| 4,788,075 A | | 11/1988 | Joseph et al. ............... 426/579 |
| 4,906,489 A | * | 3/1990 | Flango et al. ............... 426/579 |
| 4,931,302 A | * | 6/1990 | Leshik et al. ............... 426/548 |
| 5,221,549 A | | 6/1993 | Leshik ........................ 426/579 |
| 5,238,699 A | | 8/1993 | King et al. .................. 426/573 |
| 5,368,877 A | | 11/1994 | Huang et al. ............... 426/589 |
| 5,702,745 A | | 12/1997 | Yang et al. ................. 426/242 |
| 5,860,356 A | | 1/1999 | Kageyama .................... 99/330 |
| 5,897,902 A | | 4/1999 | Kemp et al. ................ 426/412 |

* cited by examiner

*Primary Examiner*—Nina Bhat
(74) *Attorney, Agent, or Firm*—Larson & Taylor, PLC

(57) ABSTRACT

A rice pudding formulation which incorporates 2–16% dry weight parboiled medium grain rice which is processed by ultra-high temperature treatment of at least 230° F. for a time effective to produce sporecidal activity and to produce a rice pudding product which has a relatively-low level of microbiological activity and which is suitable for refrigerated distribution. The parboiled, medium grain rice is more tolerant to the high temperature and shear conditions of UHT processing. The rice maintains a soft texture for greater than 60 days of refrigerated storage in the finished rice pudding product.

18 Claims, No Drawings

REFRIGERATED READY TO EAT ASEPTICALLY PRODUCED RICE PUDDING

FIELD OF THE INVENTION

The invention relates to a ready-to-eat rice pudding formulation and method of preparation using ultra-high temperature during processing and packaging in a manner which results in sterility or a relatively-low level of microbiological activity.

BACKGROUND OF THE INVENTION

Ready-to-eat food products are becoming increasingly more popular. In particular, consumers look for products which are packaged in individual or multiple serving size containers, require minimal preparation time and are extended shelf life, refrigerated products. Further, as consumers have become more health conscious, there is a tendency toward purchasing ready-to-eat food products which are wholesome and have a homecooked taste. Among the commonly purchased types of ready-to-eat food products are desserts, including puddings. One of the more popular puddings because of nutritional value as well as taste is rice pudding. However, rice pudding tends to have a shorter shelf life than other types of ready-to-eat pudding formulations due to the fact that the amylopectin fraction in rice starch causes retrogradation/firming during refrigerated storage.

Aseptically-packaged, ready-to-eat puddings are conventionally prepared by batching and homogenizing the ingredients and then subjecting the resultant pudding formulation to ultra-high temperature ("UHT") processing. Rice pudding formulations are typically manufactured with a long grain rice or a raw milled medium grain rice. Long grain rice survives UHT processing better than raw milled medium grain rice. However, while long grain rice yields intact kernels with acceptable texture immediately after processing, over a relatively short time (e.g., 30 days) in refrigerated storage, the texture of the long grain rice kernels becomes unacceptably firm and mealy. Raw milled medium grain rice sustains more damage than long grain rice during UHT processing, resulting in fewer intact kernels immediately after processing. Rice kernel texture is initially soft and desirable, however, pudding texture tends to be somewhat starchy or pasty due to starch leached from damaged rice kernels. Over time in refrigerated storage, raw milled medium grain rice kernels become firm, but less firm than long grain rice stored under the same conditions. Rather than unacceptable firmness, raw milled medium grain rice kernels in UHT pudding applications develop an unacceptable mealy, grainy texture over time in refrigerated storage.

Conventional rice pudding products, such as Kozy Shack rice pudding, are batch pasteurized rather than UHT processed. In the batch pasteurization process, all ingredients, including rice, milk, sugar, eggs, vanilla and salt are added into batch cooker and heated up to 190° F. for over 30 minutes. Then the products are hot filled, vacuum-sealed, and cooled to 45° F. The heating time and temperature conditions for batch pasteurization are less severe than for the UHT process and therefor spores survive the batch pasteurization process. Regular milled medium grain rice can keep its integrity well in batch pasteurization process. The overall shelf life ranges from 60–75 days depending on the pack size.

U.S. Pat. No. 4,788,075 to Joseph et al. discloses a method for producing aseptically-packaged puddings. According to the invention, conventional pudding ingredients are homogenized and then subjected to a high-temperature, short-time treatment sufficient to render the formulation commercially sterile and to fully gelatinize the starch contained in the formulation. U.S. Pat. No. 5,238,699 to King et al. discloses a ready-to-eat UHT low/no fat pudding in which calcium-sensitive, thermally-irreversible gelling hydrocolloids such as calcium alginate are utilized as a total or partial replacement for the fat component. U.S. Pat. No. 5,221,549 to Leshik discloses the incorporation of polyphosphate into a UHT low/no fat pudding to reduce the amount of protein aggregation which results from the heat treatment. However, all of these patents fail to disclose a pudding formulation containing rice wherein the rice maintains its integrity and soft texture during extended refrigerated shelf life.

Accordingly, there is a need in the art for a ready-to-eat rice pudding wherein the rice maintains a soft texture throughout storage for at least 60 days of refrigerated storage.

SUMMARY OF THE INVENTION

Thus, it is a purpose of the present invention to overcome the disadvantages of the prior art and thereby provide a ready-to-eat rice pudding comprising a pudding formulation wherein the rice component of the rice pudding formulation comprises 2–16% by weight of dry parboiled medium grain rice based on the total rice pudding formula weight.

In accordance with a preferred embodiment of the invention, there is provided a method for preparing a ready-to-eat rice pudding comprising combining water, a source of soluble calcium, a thickening agent, a sweetener and an emulsifier to form a slurry; subjecting the slurry to homogenization; adding a parboiled medium grain rice to the slurry to form a rice and slurry mixture and cooking the rice and slurry mixture at a temperature of at least 230° F. for a period of time effective to produce sporecidal activity and to produce a rice pudding product which has a relatively-low level of microbiological activity. The rice pudding product which possesses a low microbial count is suitable for refrigerated distribution and will achieve at least 60 days refrigerated storage. Sporecidal activity for purposes of this disclosure is defined as a heat treatment which is effective to kill spores but may not necessarily kill all spores. The method further provides for cooling the pudding formulation; and packaging the pudding formulation. Other rice pudding formulations which incorporate a protein such as soy may be produced without the incorporation of a source of soluble calcium.

In another preferred embodiment of the invention, a method for preparing a ready to eat rice pudding comprises preparing a pudding formulation comprising 45–75% by weight water, 0.5–25% by weight sweetener, 0–10% by weight milk fat, 1.5–10% by weight non-fat milk solids, 0–10% by weight egg yolk, 0.2–1.5% by weight thickening agent and 0.05–0.5% by weight emulsifier/stabilizer based on total weight of the rice pudding formula. 2–16% by weight of dry parboiled medium grain rice based on the total rice pudding formula is added to form a rice and slurry mixture which is then cooked at a temperature of at least 230° F. for a period of time effective to produce sporecidal activity and to produce a rice pudding product which has a relatively-low level of microbiological activity. The resultant pudding is cooled to a temperature of 32–140° F. and packaged.

In yet another preferred embodiment of the invention, a ready-to-eat rice pudding having a refrigerated storage life of at least 60 days comprises a pudding formulation comprising water, a source of soluble calcium or protein, a thickening agent, sweetener and an emulsifier and 2–16% by weight of dry parboiled medium grain rice based on the total rice pudding formula weight, the rice pudding being prepared in an ultra high temperature process wherein the rice and pudding formulation are cooked at a temperature of at least 230° F. for a period of time effective to produce sporecidal activity and to produce a rice pudding product which has a relatively-low level of microbiological activity.

It is, therefore, an object of the invention to provide a ready-to-eat rice pudding formulation produced in an ultra high temperature process which maintains a soft rice texture throughout storage for at least 60 days of refrigerated storage.

Further objects of the invention will become apparent from the detailed description that follows.

DETAILED DESCRIPTION OF THE PREFERRED EMBODIMENTS

In accordance with the invention, an ultra-high temperature ("UHT"), i.e., above 230° F., processed and packaged pudding having a rice level of from 2 to 16% (by weight of dry rice based on the total rice pudding formula weight) is prepared using a combination of conventional ready-to-eat pudding ingredients and parboiled medium grain rice. The inventors have found that either instant parboiled or non-instant parboiled medium grain rice exhibits better rice kernel integrity than raw milled medium grain rice in UHT processed pudding applications. The pudding matrix texture is less pasty or starchy than pudding produced with raw milled medium grain rice. Like raw milled medium grain rice, the initial parboiled medium grain rice kernel texture is soft and tender. Over an extended period of time, i.e., 60 days or longer, in refrigerated storage, parboiled medium grain rice kernels remain soft and tender, without developing the graininess and mealiness found in raw milled rice kernels under extended refrigerated storage.

Parboiled rice is defined as rough, whole-kernel rice with the hull remaining, which has been soaked in warm water under pressure, steamed and dried before milling. Parboiled rice differs greatly from raw milled rice and its properties, depending on the type and severity of parboiling. For more specific details on the parboiling process, please see Bhattacharya, K. R., 1985. Parboiling of Rice. Pages 289–342 in: Rice Chemistry and Technology, B. Juliano ed., American Association of Cereal Chem., St. Paul, Minn. which is herein incorporated by reference.

Parboiling forms an amylose complex and produces a more compact arrangement of starch in the kernel. This helps to keep the starch granule intact and reduces amylose leaching during cooking. The parboiled rice possesses a firmer texture that is due in large part to reassociation of gelatinized starch. The inventors have discovered that this firmer rice kernel is more tolerant to the high temperature and shear conditions of UHT processing. The heat treatment during parboiling also disrupts and denatures the protein bodies, which improves grain hardness for better rice stability during UHT processing.

The inventors have also found that instant parboiled medium grain rice will maintain rice grain integrity through UHT processing, however, to a lesser extent than regular parboiled medium grain rice. The instantizing process combines rehydration followed by drying of the parboiled medium grain rice to a stable moisture of about 9.5% which results in a kernel of slightly lower density. The expansion is the result of increased porosity throughout the pre-cooked rice kernels. This increased porosity results in a much greater surface area, allowing the pudding matrix to effectively penetrate into the individual kernels, improving the softening characteristics of each kernel. Thus, instant parboiled medium grain rice does provide an added benefit of maintaining a softer texture over a longer period of time.

The emulsifier level and specific thickening agents used in the pudding formulation preferably are incorporated to maintain a soft rice texture through storage. The emulsifier(s) retards retrogradation of the amylopectin portion of the starch in the rice grains. While the presence of parboiled medium grain rice in a UHT rice pudding will alone retard the rate of firming over time, the combination of parboiled medium grain rice with emulsifiers and specific thickening agents further helps to slow the rate of firming of the rice kernel after processing. The fat, if incorporated in the preferred embodiment, is preferably a liquid shortening such as a vegetable or canola oil, but may be a non-liquid shortening such as butter and animal fats. Any emulsifier that is conventionally used in puddings may be utilized. The preferred emulsifiers include mono and di-glycerides and sodium stearoyl lactylate. One or more emulsifiers or fats, or combinations thereof may be utilized.

The use of thickening agents, e.g., starch, gelatin or carageenan, in the pudding formulation provide suspension of rice in the pudding while not negatively impacting mouthfeel. Suspension of rice in the pudding is critical to the appearance of the pudding and ensures consistent rice delivery to each container. Thickening agents also help to maintain the soft rice texture over time because they help maintain the desired ratio of rice to slurry constant which is critical in keeping the rice kernel adequately hydrated.

Protein aggregation has been found to occur when ready-to-eat rice puddings are processed at temperatures above 230° F. This protein aggregation is evidenced by the development of a speckled, translucent appearance within the pudding and a chalky mouthfeel from the pudding. In this invention, a low level of polyphosphates, in particular pyrophosphate and tetrasodium pyrophosphate, is used to minimize and/or control the degree of protein aggregation in ultra-high temperature processing conditions. Incorporating polyphosphates into the ready-to-eat rice pudding formula significantly reduces the aggregate size to prevent unpleasant grainy texture in finished product.

In a preferred method for preparing the pudding product, water is heated to a temperature between 90 and 150° F. and any thickening agents are added and thoroughly mixed using a relatively high level of agitation. Milk or milk products (e.g., whole, low fat, skim milk, non-fat dry milk, whole milk powder, or heavy cream, whey, milk protein concentrate) is then added to the liquid mix. Any fatty ingredients (e.g., fats, emulsifiers and/or stabilizers) may then be added to the heated liquid components. Thereafter, the dry ingredients are added to the liquid mix using a relatively high level of agitation. Such agitation may be provided by an induction mixer or the like. Any egg solids and volatile flavor components are added last in order to minimize the denaturization of egg protein and the volatilization of flavors from exposure to heat.

The slurry mixture is then mixed to effect thorough and complete dispersion, such as by homogenization. Typically, the mixture is heated to a temperature between 120 and 130° F. and then passed through a mixing apparatus (e.g. a Manton-Gaulin.™ homogenizer or a Bran-Lubbe™ homogenizer) in either a single or multiple-stage at an appropriate pressure. The slurry may be held in an intermediate, agitated hold tank which serves as a buffer against process disruptions; if held, the slurry should be maintained at a temperature below 45° F. to retard microbiological growth.

The rice is added to the slurry and mixed to thoroughly disperse the rice in the slurry. The rice addition is typically conducted with some type of rice feeding device, such as a loss-in-weight feeder, whereby the rice is metered into an intermediate mix tank. The rice may be dry or pre-soaked. Pre-soaking is performed using conventional methods such as batch cooking, continuous cooking, steaming or soaking with or without heat in excess water. The disadvantages of utilizing presoaked rice includes an added processing step, and loss of nutrients. Slurry flowrate and rice feedrate into the intermediate mix tank are controlled to maintain the desired rice level, typically about 2–16% by weight of dry rice based on the total rice pudding formula weight.

Cooking may be effected using either direct or indirect heat. Steam injection is typically utilized for applying direct heat. More preferably, the ultra-high temperature processing of the pudding composition is conducted in a scraped-surface heat exchange apparatus so as to best accommodate the increasing viscosity of the mixture during heating. In the ultra-high temperature processing step, the composition is heated to at least 230° F. for a time effective to product sporecidal activity and to produce a rice pudding product which has a relatively-low level of microbiological activity and, more preferably, to a temperature range of from about 275° F. to about 300° F. for 0.6 seconds to 15 seconds in a suitable holding tube, where the composition is held at the desired temperature for the necessary time required to effect cooking and microbial kill. In addition to the UHT process, the rice slurry mix may be held prior to the hold tube at a temperature within the range of 40° F. to 300° F. for the necessary time required, typically from 0 to 10 minutes to effect rice hydration and provide desired finished rice texture.

Thereafter, the cooked composition is cooled to a temperature suitable for filling into containers that are then sealed. The cooling step is accomplished while the mix is being subjected to shear conditions. Cooling may be accomplished using tubular and/or scraped-surface heat exchangers.

The cooled pudding formulation is then packaged. Where the product container is a plastic material to be sealed with an adhesively-applied foil lid, the product is usually cooled to a product temperature of 32–140° F., typically below about 130° F., and preferably below 80° F. If an aseptic-packaging process is to be implemented, the process will further include steps of sterilizing the containers and lids into which the sterilized pudding is packaged and then filling the container with pudding in a sterile environment. Such known methods as superheated steam, hydrogen peroxide, ultraviolet light, high-intensity light, irradiation, etc., are useful for sterilizing the packaging materials which, in the case of pudding, are typically composed of single-service or multiservice, cup-shaped, plastic containers and flexible lid stock. The lid stock, may be foil-laminated polyester with a heat-sealable coating that can be heat sealed onto the container. The plastic container may be a thermoformed or molded container fabricated from a material such as high-impact polystyrene. The sterilization steps are also desirable to reduce microbial activity even in the event that a true aseptic process in not being sought, such as when the pudding is placed in a refrigerated distribution system and sterility is not required but extended storage life is desirable.

The formulations of the invention incorporating parboiled medium grain rice processed in this manner produce a packaged rice pudding that has intact rice particles and soft rice texture over extended refrigerated 35–45° F. pudding shelf life.

The puddings of the invention will typically have a composition in accordance with the following formula that represents an unflavored and uncolored pudding mix, where the % weight ranges of all components stated herein is based on the finished weight of the pudding formulation including the rice.

| INGREDIENTS | PREFERRED RANGE % WEIGHT | MOST PREFERRED RANGE % WEIGHT |
| --- | --- | --- |
| Water | 45.00–75.00 | 55.00–70.00 |
| Sweetener | 0.5–25.00 | 7.00–17.00 |
| Dry Parboiled Medium Grain Rice | 2–16 | 4–8 |
| Milk Fat | 0–10.00 | 2.00–7.00 |
| Milk Solids | 1.50–10.00 | 3.00–6.50 |
| Egg Yolk | 0.00–10.00 | 0.30–5.00 |
| Thickening Agent | 0.20–1.50 | 0.40–0.80 |
| Emulsifier/Stabilizer | 0.05–0.50 | 0.10–0.40 |

Flavor and color agents and other functional ingredients may be added to the pudding as desired.

The invention is further described but not limited by the following examples.

EXAMPLE 1

A rice pudding, made with dry parboiled medium grain rice and a pudding formulation, was prepared using the following ingredients:

| INGREDIENT | % WEIGHT |
| --- | --- |
| Water | 62.71 |
| Heavy Cream | 12.09 |
| Sugar | 11.16 |
| Dry Parboiled Medium Grain Rice | 7.00 |
| Non-Fat Dry Milk | 5.34 |
| Flavor/Color | 0.58 |
| Carrageenan | 0.51 |
| Egg Yolk | 0.37 |
| Sodium Stearoyl Lactylate | 0.19 |
| Tri-Sodium Pyrophosphate | 0.04 |
| Sodium Acid Pyrophosphate | 0.02 |

The pudding formulation was prepared by adding water to a batch tank and heating to 150° F. The carrageenan (mixed with sugar) was added and thoroughly dispersed. The temperature of the mix was brought to 125° F. and the non-fat dry milk was added. The sodium stearoyl lactylate was then added to the tank. The remaining ingredients (except flavors and egg yolk) were then added and the temperature of the mix was again brought to 125° F. Flavors and egg yolk were added and the mix was homogenized at 2000 psig in a first stage and 500 psig in a second stage. The temperature was maintained at about 125° F. during homogenization. The slurry mixture was then cooled to about 40° F. and held in a tank prior to being pumped in a continuous manner through a series of plate heat exchangers, wherein the temperature was raised to about 180° F., to an intermediate tank. The dry parboiled medium grain rice was continuously fed at a level of about 7% by weight based on the weight of the pudding formulation into the intermediate tank. The rice and slurry mixture was pumped in a continuous manner through a series of scraped surface heat exchangers where the temperature was elevated to 280° F. The formulation was maintained at 280° F. for more than 15 seconds and then immediately cooled to about 140° F. The pudding formulation was then further cooled to below about 60° F. and packaged in single-serving plastic cups.

After analysis, the rice pudding was found to possess intact rice particles and a desirable rice texture comparable to homemade rice pudding. This desirable rice texture was maintained for over 90 days of refrigerated storage.

EXAMPLE 2

A rice pudding, made with dry instant parboiled medium grain rice and a pudding formulation, was prepared having the following ingredients:

| INGREDIENT | % WEIGHT |
| --- | --- |
| Water | 62.71 |
| Heavy Cream | 12.09 |
| Sugar | 11.16 |
| Dry Instant Parboiled Medium Grain Rice | 7.00 |
| Non-Fat Dry Milk | 5.34 |
| Flavor/Color | 0.58 |
| Carrageenan | 0.51 |
| Egg Yolk | 0.37 |
| Sodium Stearoyl Lactylate | 0.19 |
| Tri-Sodium Pyrophosphate | 0.04 |
| Sodium Acid Pyrophosphate | 0.02 |

The pudding formulation was prepared by adding water to a batch tank and heating to 150° F. The carrageenan (mixed with sugar) was added and thoroughly dispersed. The temperature of the mix was brought to 125° F. and the non-fat dry milk was added. The sodium stearoyl lactylate was then added to the tank. The remaining ingredients (except flavors and egg yolk) were then added and the temperature of the mix was again brought to 125° F. Flavors and egg yolk were added and the mix was homogenized at 2000 psig in a first stage and 500 psig in a second stage. The temperature was maintained at about 125° F. during homogenization. The slurry mixture was then cooled to about 40° F. and held in a tank prior to being pumped in a continuous manner to an intermediate tank. The dry instant parboiled medium grain rice was continuously fed at a level of about 7% by weight based on the weight of the pudding formulation into the intermediate tank. The rice and slurry mixture was pumped in a continuous manner through a series of scraped surface heat exchangers where the temperature was elevated to 280° F. The formulation was maintained at 280° F. for more than 15 seconds and then immediately cooled to about 140° F. The pudding formulation was then further cooled to below about 45° F. and packaged in single-serving plastic cups.

After analysis, the rice pudding was found to possess intact rice particles and a desirable rice texture comparable to homemade rice pudding. This desirable rice texture was maintained for over 90 days of refrigerated storage.

EXAMPLE 3

A rice pudding, made with pre-soaked rice and a pudding formulation, was prepared having the following ingredients:

| INGREDIENT | % WEIGHT |
| --- | --- |
| Water | 48.03 |
| Pre-Soaked Parboiled Medium Grain Rice | 28.00 |
| Sugar | 10.30 |
| Heavy Cream | 7.92 |
| Non-Fat Dry Milk | 4.13 |
| Egg Yolk | 0.72 |
| Flavor/Color | 0.45 |
| Gelatin | 0.29 |
| Sodium Stearoyl Lactylate | 0.14 |
| Tri-Sodium Pyrophosphate | 0.01 |
| Sodium Acid Pyrophosphate | 0.01 |

The parboiled medium grain rice was pre-soaked in 70° F. water at a 2:1 water to rice ratio for about 2 hours; the rice was then screened to separate it from the water. The pudding formulation was prepared by adding water and skim milk to a batch tank and heating to 125° F. The sodium stearoyl lactylate was then added to the tank. The remaining ingredients (except flavors and egg yolk) were then added and the temperature of the mix was again brought to 125° F. Flavors and egg yolk were added and the mix was homogenized at 2000 psig in a first stage and 500 psig in a second stage. The temperature was maintained at about 125° F. during homogenization. The slurry mixture was then held in a tank prior to being pumped in a continuous manner to an intermediate tank into which the pre-soaked parboiled medium grain rice was continuously added at a level of about 28% by weight based on the weight of the pudding formulation into the intermediate tank. The rice and slurry mixture was pumped in a continuous manner from the intermediate tank through a series of scraped surface heat exchangers where the temperature was elevated to 280° F. The formulation is maintained at 280° F. for more than 15 seconds and then immediately cooled to about 140° F. The pudding formulation is then further cooled to below about 80° F. and packaged in single-serving plastic cups.

After analysis, the rice pudding was found to possess intact rice particles and a desirable rice texture comparable to homemade rice pudding. This desirable rice texture was maintained for over 60 days of refrigerated storage.

Comparative Example 1

Instant long grain parboiled rice was substituted for the parboiled medium grain rice and was incorporated to make rice puddings by using the same formula and process conditions listed in Example 1. However, the rice texture became firmer and firmer during refrigerated storage. The shelf life of this refrigerated rice pudding is less than 2 weeks. Therefore, the product quality was unacceptable.

Comparative Example 2

Frozen medium grain IQF (Individual Quick Frozen) rice was substituted for the parboiled medium grain rice and was used to make rice puddings using the same formula and process conditions listed in Example 2. However, the integrity of rice was damaged during the UHT process. The rice texture became mushy right after processing, and the pudding matrix was starchy and pasty. Therefore the product quality was unacceptable.

Comparative Example 3

Riviana instant medium grain rice was substituted for the parboiled medium grain rice and was used to make rice puddings using the same formula and process conditions listed in Example 2. However, the integrity of rice was damaged during the UHT process. The rice texture became mushy right after processing, and the pudding matrix was starch and pasty. Therefore, the product quality was unacceptable.

Although the invention has been described herein by reference to several embodiments thereof, it will be readily understood by those skilled in the art that variations and modifications to the embodiments can be made without departing from the scope and spirit of the invention.

What is claimed is:

1. An improved ready to eat rice pudding having an extended refrigerated storage life of at least 60 days wherein the improvement comprises:

the incorporation of 2–16% by weight of dry parboiled medium grain rice based on the total rice pudding formula weight, said rice pudding being prepared in an ultra high temperature process wherein said rice and pudding formula mixture are prepared by cooking the mixture at a temperature of at least 230° F. for a time effective to produce sporecidal activity and to produce a rice pudding product which has a relatively-low level of microbiological activity and which is suitable for refrigerated distribution.

2. The ready to eat rice pudding according to claim 1 wherein said rice comprises 4–8% of said pudding formula.

3. The ready to eat rice pudding according to claim 1 wherein said pudding contains a thickening agent is selected from the group consisting of starch, carageenan and gelatin.

4. The ready to eat rice pudding according to claim 1 wherein cooking is from 275 to 300° F. for 0.6 seconds to 15 seconds.

5. The ready to eat rice pudding according to claim 1 wherein the pudding formulation comprises 45–75% by weight water, 0.5 to 25% by weight sweetener, 0–10% by weight milk fat, 1.5–10% by weight non-fat milk solids, 0–10% by weight egg yolk, 0.2–1.5% by weight thickening agent and 0.05–0.5% by weight emulsifier/stabilizer based on the total rice pudding formula weight.

6. The ready to eat rice pudding according to claim 5 wherein the pudding formula comprises 55–70% by weight water, 7 to 17% by weight sweetener, 2–7% by weight milk fat, 3–6.5% by weight non-fat milk solids, 0.3–5% by weight egg yolk, 0.4–0.8% by weight thickening agent and 0.1–0.4% by weight emulsifier/stabilizer.

7. A method for preparing a ready-to-eat rice pudding comprising:

heating water to a temperature of 90–150° F.;

adding to the water a source of soluble calcium or protein, a thickening agent, a sweetener and an emulsifier to form a slurry;

homogenizing said slurry;

mixing a parboiled medium grain rice into said slurry at a level of from 2–16% by weight of dry parboiled medium grain rice based on the total rice pudding formula weight to form a rice and slurry mixture;

cooking said rice and slurry mixture at a temperature of at least 230° F. for a time effective to produce sporecidal activity and to produce a rice pudding product which has a relatively-low level of microbiological activity and which is suitable for refrigerated distribution;

cooling the pudding to a temperature of 32–140° F.; and packaging said pudding.

8. The method according to claim 7 wherein the slurry mixture is heated to a temperature of 275 to 300° F. during said step of cooking.

9. The method according to claim 7 wherein said slurry mixture is held at a temperature of 40–300° F. to effect rice hydration between said steps of mixing and cooking.

10. The method according to claim 7 wherein said step of cooking comprises heating said slurry mixture in a scraped-surface heat exchanger and then transferring said slurry mixture to a holding tube and maintaining said slurry mixture at the effective temperature and time.

11. The method according to claim 10 wherein said slurry mixture is held in said holding tube at a temperature of 275 to 300° F. for a time of 0.6 seconds to 15 seconds.

12. The method according to claim 7 wherein said rice comprises 4–8% of said pudding formula.

13. The method according to claim 7 wherein said step of packaging comprises sterilizing containers and aseptically filling the sterilized containers with the cooled pudding.

14. A method for preparing a ready-to-eat rice pudding comprising:

preparing a pudding formulation comprising 45–75% by weight water, 0.5 to 25% by weight sweetener, 0–10% by weight milk fat, 1.5–10% by weight non-fat milk solids, 0–10% by weight egg yolk, 0.2–1.5% by weight thickening agent and 0.05–0.5% by weight emulsifier/stabilizer based on the total rice pudding formula weight;

adding 2–16% by weight of dry parboiled medium grain rice based on the total rice pudding formula weight into said pudding formulation to form a rice and slurry mixture;

cooking said rice and slurry mixture at a temperature of at least 230° F. for a time effective to produce sporecidal activity and to produce a rice pudding product which has a relatively-low level of microbiological activity and which is suitable for refrigerated distribution;

cooling the resultant pudding to a temperature of 32–140° F.; and packaging said pudding.

15. The method according to claim 14 wherein the slurry mixture is heated to a temperature of 275 to 300° F. during said step of cooking.

16. The method according to claim 14 wherein said slurry mixture is held at a temperature of 40–300° F. to effect rice hydration between said steps of mixing and cooking.

17. The method according to claim 14 wherein said rice comprises 4–8% of said pudding formula.

18. The method of claim 14 wherein the pudding formulation comprises 55–70% by weight water, 7 to 17% by weight sweetener, 2–7% by weight milk fat, 3–6.5% by weight non-fat milk solids; 0.3–5% by weight egg yolk, 0.4–0.8% by weight thickening agent and 0.1–0.4% by weight emulsifier/stabilizer.

* * * * *